(12) United States Patent
Nagao et al.

(10) Patent No.: US 7,879,941 B2
(45) Date of Patent: Feb. 1, 2011

(54) HEAT-RESISTANT SLIDING RESIN COMPOSITION, PRODUCTION PROCESS AND USE THEROF

(75) Inventors: Yuji Nagao, Kanagawa (JP); Ryuji Yamamoto, Kanagawa (JP); Satoshi Miyake, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 755 days.

(21) Appl. No.: 11/795,566

(22) PCT Filed: Jan. 20, 2006

(86) PCT No.: PCT/JP2006/301261

§ 371 (c)(1),
(2), (4) Date: Jul. 19, 2007

(87) PCT Pub. No.: WO2006/078064

PCT Pub. Date: Jul. 27, 2006

(65) Prior Publication Data

US 2008/0039574 A1 Feb. 14, 2008

Related U.S. Application Data

(60) Provisional application No. 60/647,771, filed on Jan. 31, 2005.

(30) Foreign Application Priority Data

Jan. 21, 2005 (JP) ............................. 2005-014027

(51) Int. Cl.
*C08K 3/04* (2006.01)

(52) U.S. Cl. ...................................................... 524/496
(58) Field of Classification Search .................. 524/496
See application file for complete search history.

(56) References Cited

U.S. PATENT DOCUMENTS 6,344,513 B1 2/2002 Numata
2004/0241439 A1 12/2004 Morita et al.

FOREIGN PATENT DOCUMENTS

| EP | 1 367 097 A1 | 12/2003 |
|---|---|---|
| JP | 2000-169738 A | 6/2000 |
| JP | 2001-40225 A | 2/2001 |
| WO | WO 2004/094521 A1 | 11/2004 |
| WO | WO 2005/100465 A1 | 10/2005 |
| WO | WO 2005/100483 A1 | 10/2005 |

*Primary Examiner*—Ling-Siu Choi
*Assistant Examiner*—Sonya Wright
(74) *Attorney, Agent, or Firm*—Sughrue Mion, PLLC

(57) ABSTRACT

The invention relates to a heat-resistant sliding resin composition, comprising a vapor carbon fiber having a specific surface area of 10 to 50 m²/g, a mean aspect ratio of 20 to 500 and a mean fiber diameter of 50 to 200 nm and a synthetic resin, wherein a heat deflection temperature under high load (ASTM D648) is 160° C. or higher and a thermal conductivity is 0.8 W/mK or higher. The resin composition has heat resistance, heat-radiation property and sliding property. Particularly, the resin composition, which neither wears away nor abrades a soft metal member which is a counter member under high temperature and heat generative conditions, can be employed for various sliding members such as bearings.

23 Claims, No Drawings

HEAT-RESISTANT SLIDING RESIN COMPOSITION, PRODUCTION PROCESS AND USE THEROF

CROSS-REFERENCE TO RELATED APPLICATIONS

This is an application filed pursuant to 35 U.S.C. Section 111(a) with claiming the benefit of U.S. provisional application Ser. No. 60/647,771 filed Jan. 31, 2005 under the provision of 35 U.S.C. 111(b), pursuant to 35 U.S.C. Section 119(e)(1).

TECHNICAL FIELD

The present invention relates to a resin composition excellent in heat resistance, heat-radiating performance and sliding property. More particularly, the invention relates to a heat-resistant resin composition used for sliding members which neither wears away nor abrades a soft metal member which is a counter member of a sliding member such as bearings under high temperature and heat generative conditions.

BACKGROUND ART

Generally, when the resin is heated to a temperature equal to or higher than the glass transition temperature or the melting point, molecular motion thereof is highly activated so that the solid state cannot be maintained, whereby the resin is liquefied. Meanwhile, sliding members such as automotive brake components and bearings and fuel cell separators are exposed to an environment heated to 80° C. to 120° C. depending on their use conditions. Thus, in order for a resin to be used under such a condition, the resin must have heat resistance and a heat-radiation property.

One known method for imparting heat resistance to resin is a method of incorporating an inorganic filler into the resin. Through incorporation of inorganic particles into the resin, motion of resin molecules is restricted and constrained, thereby elevating the softening temperature point of the resin composition. In addition, addition of inorganic filler can improve thermal conductivity of the resin. Hitherto, ceramic powder and carbon materials (carbon particles, carbon fiber, etc.) have been employed as such fillers. Among them, carbon materials have been employed in sliding members and fuel cell separators, for their chemical inertness, high self-lubricity and high electrical conductivity.

However, carbon particles form thermal conduction paths through point-contact between particles. Therefore, in order to attain satisfactory thermal conductivity, a large amount of carbon particles must be incorporated into resin, which results in difficulty in preventing decrease in mechanical strength. On the other hand, carbon fiber, which is formed of carbon material which is difficult to graphitize and difficult to crystallize, has poor thermal conductivity and cannot fully attain shape-derived advantages. In fact, in order to attain satisfactory heat conductance (e.g., a thermal conductivity of 0.8 W/mK or more), carbon fiber must be added in an amount of 50 mass % or more, like in the case of carbon particles. Furthermore, since carbon fiber has a rigid structure, a resin composition containing carbon fiber exhibits significant shrinkage anisotropy in molding process, so that there is a problem that it is difficult to control dimensional accuracy.

In recent years, there has arisen keen demand for a heat-resistant slide bearing made of synthetic resin, which can exhibit an excellent sliding property in a high-temperature atmosphere, and some proposals have been made. For example, Japanese Patent Application Laid-Open (kokai) Nos. 2000-169738 and 2001-40225 disclose sliding members formed from a resin composition obtained by adding tetrafluoroethylene resin to polyether-ether-ketone resin which is excellent in heat resistance and mechanical strength and is widely employed in various industrial fields. Although the technique aims at improvement in the sliding property through addition of tetrafluoroethylene resin serving as a lubricant substance, wear resistance and mechanical strength remain insufficient and therefore the fact is that an additional reinforcing material such as carbon fiber or glass fiber is used to make up for the insufficiency. Such a composite material containing carbon fiber and glass fiber as additives has been employed in practice with a counter member made of steel (SUS 45). However, the composite material problematically wears the steel counter member.

DISCLOSURE OF THE INVENTION

Recently, in order to reduce the weight of a sliding member such as a bearing, an aluminum counter member has been more widely used. However, in a case where a soft metal is used as a counter member of a sliding member, the counter member is considerably worn out due to damage and also, wear resistance of the sliding member itself may be reduced in accordance with the damage in the counter member.

The present inventors have carried out extensive studies in order to solve the aforementioned problem, and have attained development of a resin composition exhibiting good heat resistance, high heat-radiation performance and wear resistance, by blending a heat-resistant resin with a vapor grown carbon fiber having high crystallinity and high aspect ratio with low shear force.

Accordingly, the present invention is directed to the resin composition, production method, and use thereof, as follows.

[1] A heat-resistant sliding resin composition, comprising a vapor grown carbon fiber having a specific surface area of 10 to 50 m$^2$/g, a mean aspect ratio of 20 to 500 and a mean fiber diameter of 50 to 200 nm and a synthetic resin, wherein a heat deflection temperature under high load (ASTM D648) is 160° C. or higher and a thermal conductivity is 0.8 W/mK or higher.

[2] The heat-resistant sliding resin composition as described in 1 above, wherein the vapor grown carbon fiber is contained in an amount of 5 to 370 parts by mass with respect to 100 parts by mass of the synthetic resin.

[3] The heat-resistant sliding resin composition as described in 1 or 2 above, containing 5 to 200 parts by mass of a carbon fiber having a mean fiber diameter of 1 to 30 μm blended therein with respect to 100 parts by mass of the synthetic resin.

[4] The heat-resistant sliding resin composition as described in 3 above, wherein the vapor grown carbon fiber is contained in an amount of 5 to 75 parts by mass and the carbon fiber having a mean fiber diameter of 1 to 30 μm is contained in an amount of 5 to 75 parts by mass, with respect to 100 parts by mass of the synthetic resin.

[5] The heat-resistant sliding resin composition as described in 3 above, wherein the vapor grown carbon fiber is contained in an amount of 45 to 370 parts by mass and the carbon fiber having a mean fiber diameter of 1 to 30 μm is contained in an amount of 8 to 200 parts by mass, with respect to 100 parts by mass of the synthetic resin.

[6] The heat-resistant sliding resin composition as described in any one of 1 to 5 above, wherein the volume resistivity falls within a range of $1\times10^{-3}$ to $1\times10^2$ Ωcm and a thermal conductivity is 1.5 W/mK or higher.

[7] The heat-resistant sliding resin composition as described in any one of 1 to 6 above, wherein the synthetic resin is a heat-resistant resin having a glass transition temperature of 160° C. or higher and/or a melting point of 160° C. or higher.

[8] The heat-resistant sliding resin composition as described in 7 above, wherein the heat-resistant resin is at least one species selected from among fluororesin, polyimide, polyamide-imide, polyether-imide, polyether-ether-ketone, polyether-ketone, polysulfone, polyether-sulfone, polybenzimidazole, poly(phenylene sulfide), poly(ethylene naphthalate), polyarylate, aromatic polyamide, polycarbonate, modified polyphenylene ether, poly(butylene terephthalate), poly(ethylene terephthalate), cycloolefin polymer, polypropylene, epoxy resin, phenolic resin, and unsaturated polyester resin.

[9] A method for producing the heat-resistant sliding resin composition as recited in any one of 1 to 7 above, comprising blending a vapor grown carbon fiber into a molten synthetic resin or a liquid resin raw material which forms a synthetic resin when cured.

[10] The method for producing a heat-resistant sliding resin composition as described in 9 above, wherein breakage of the vapor grown carbon fiber during mixing is suppressed to 20% or less.

[11] The method for producing a heat-resistant sliding resin composition as described in 9 above, wherein mixing is performed at an energy of 5,000 MJ/m$^3$ or less.

[12] A sliding material which is formed through molding of the heat-resistant sliding resin composition as recited in any one of 1 to 6 above.

[13] The sliding material as described in 12 above, wherein molding is performed through injection molding.

[14] A gear using a sliding material formed through molding the heat-resistant sliding resin composition as recited in 4 above.

[15] A bearing for use in a sliding friction or rolling friction mechanism, which bearing is formed through molding the heat-resistant sliding resin composition as recited in 4 above.

[16] A bearing using a sliding material formed through molding the heat-resistant sliding resin composition as recited in 4 above.

[17] A brake component using a sliding material formed through molding the heat-resistant sliding resin composition as recited in 4 above.

[18] A clutch component using a sliding material formed through molding the heat-resistant sliding resin composition as recited in 4 above.

[19] A seal member using a sliding material formed through molding the heat-resistant sliding resin composition as recited in 4 above.

[20] A piston ring using a sliding material formed through molding a heat-resistant sliding resin composition as recited in 4 above.

[21] A resin component for use in a mechanical transmission mechanism, the resin component employing a sliding material formed through molding a heat-resistant sliding resin composition as recited in 4 above.

[22] A clock mechanism component employing a sliding material formed through molding a heat-resistant sliding resin composition as recited in 4 above.

[23] A separator for use in a polymer electrolyte fuel cell, the separator employing a sliding material formed through molding a heat-resistant sliding resin composition as recited in 5 above.

The resin composition of the present invention contains a vapor grown carbon fiber having high thermal conductivity and good friction resistance as compared with those of carbon fibers. Thus, by using the composition as a sliding member in an automotive brake, a bearing or the like, mechanical wear of a counter member can be greatly reduced. In addition, the composition of the present invention provides excellent heat resistance and heat-radiation performance under high-temperature conditions and maintains lubricity for a long period of time.

BEST MODE FOR CARRYING OUT THE INVENTION

The present invention will next be described in detail.

The vapor grown carbon fiber employed in the present invention has a BET specific surface area of 10 to 50 m$^2$/g, preferably 12 to 45 m$^2$/g, more preferably 15 to 40 m$^2$/g. When the BET specific surface area is in excess of 50 m$^2$/g, surface energy and aggregation energy of the carbon fiber increase to thereby accelerate adhesion and aggregation of fiber filaments, which leads to reduction in dispersibility of the carbon fiber in synthetic resin. When aggregated carbon fiber filaments remain in the resin, uniform paths for thermal conduction and electrical conduction cannot be formed and in such a case, a resin composition having a satisfactory thermal conductivity (e.g., thermal conductivity of 0.8 W/mK or higher) cannot be obtained.

The vapor grown carbon fiber employed in the present invention has a mean fiber diameter of 50 to 200 nm, preferably 50 to 130 nm. When the mean fiber diameter is less than 50 nm, the surface energy increases exponentially, whereby aggregation force among fiber fragments is drastically elevated. The thus-aggregated vapor grown carbon fiber is difficult to satisfactorily disperse in a resin by simple kneading, which results in fiber agglomerates scattered in the resin and therefore a conductive network cannot be effectively formed. Moreover, when an impact or a load is applied to the resin, such agglomerates remaining in the resin due to maldispersion become stress concentration sites to thereby provide a cause to destroy the resin composition and therefore, such agglomerates are not preferred. When the mean fiber diameter is in excess of 200 nm, a larger amount of vapor grown carbon fiber must be added so as to attain desired properties, such as thermal conductivity, which leads to giving adverse effects on mechanical strength and other physical properties.

In order to disperse carbon fiber in the resin without leaving aggregated filaments therein, one possible approach is application of high energy to the mixture during kneading. Specifically, the temperature of the resin during kneading is controlled to as low a temperature as possible, thereby increasing melt viscosity of the resin. Alternatively, there may also be employed an approach of increasing torque by increasing the screw rotation rate, or an approach of application of high shear force through employment of a stone-mill-like kneading disk. Dispersion mechanism in the method where a stonemill-like kneading disk is used is very similar to that of a wet pulverization method by use of a bead mill or the like and the method is a method where by applying a shear force greater than re-aggregation force, agglomerates are pulverized to form microparticles to thereby separate the particles. When this technique is employed in agglomerates formed of vapor grown carbon fiber, the agglomerates are destroyed and the filaments of the carbon fiber are broken short, and the broken short filaments of the vapor grown carbon fiber are dispersed and distributed in the resin. Needless to say, such broken short filaments, which have lost both thermal conductivity and electrical conductivity-imparting performance the high-aspect-ratio vapor grown carbon fiber before pulverization had, are not preferred and, this phenomenon will be described also in the next paragraph relating to aspect ratio.

The vapor grown carbon fiber employed in the present invention and included in the composition of the present invention has an aspect ratio of 20 to 500, preferably 50 to 300, more preferably 100 to 200. The inventors have conducted studies on properties of the resin composition by using a variety of aspect ratios of vapor grown carbon fiber, and have found that thermal conductivity and electrical conductivity of the resin increases with aspect ratio, and that the enhancement effect gradually decreases with further increase of aspect ratio. The inventors have also found that, when the aspect ratio exceeds a threshold value, thermal conductivity or other properties begin to deteriorate, thereby increasing the amount of vapor grown carbon fiber to be added.

Vapor grown carbon fiber has a tube structure where tubes formed of rolled hexagonal carbon network sheets are telescoped. Therefore, mobility of heat and electrons is considerably high in a sheet-plane direction (i.e., longitudinal direction of fiber filament), whereas mobility of heat and electrons in a sheet-stacking direction (i.e., the radial direction of fiber filament) is considerably lower as compared with the mobility in the fiber longitudinal direction, due to the presence of discontinuity in the radial direction. Thus, in order to impart the resin with high thermal conductivity and electrical conductivity, long fiber filaments must contact with each other.

When the aspect ratio is in excess of 500, fiber filaments are further entangled together and since the thus-entangled filaments are difficult to sufficiently ravel out into single filaments under application of shear force which is within a range of not breaking fiber filaments, a network for effective thermal conduction and electrical conduction cannot be formed. In contrast, when the aspect ratio is less than 20, dispersibility of the fiber filaments in the resin is remarkably high, which leads to an adverse effect on maintaining contact between filaments which are excessively diffused. In order to form an electrically conductive network (i.e., provide and maintain contact between filaments), such a vapor grown carbon fiber must be added in an amount of 5 parts by mass or more based on 100 parts by mass of the resin, leading to remarkable decrease in fluidity and tensile strength of the resin, which is not preferred. In addition, when the aspect ratio is less than 20, wear resistance of the resin composition decreases, and such a resin composition is not suitable for sliding material.

The vapor grown carbon fiber employed in the present invention preferably has a mean interplanar spacing $d_{002}$, as measured through an X-ray diffraction method, of 0.345 nm or less, more preferably 0.343 nm or less, still more preferably 0.340 nm or less.

As mentioned above, in the synthetic vapor grown carbon fiber, carbon is concentrically deposited with respect to each carbon hollow tube, and the fiber filament grows concentrically like tree rings such that carbon sheath layers are formed in the radial direction. The interval between the layers corresponding to tree rings is called as interplanar spacing $d_{002}$. Immediately after reaction, deposited carbon graphenes are arranged in a highly disordered manner, and fiber filaments have microscopically rough surfaces. Through heat treatment, the arrangement of graphenes can be ordered, and fiber filament surfaces can be made smooth. As a result, electron mobility can be enhanced and contact resistance can be lowered. Therefore, electrical conductivity can be imparted to the resin through addition of a small amount of vapor grown carbon fiber. In other words, in a vapor grown carbon fiber having a mean interplanar spacing $d_{002}$ more than 0.345 nm, due to its insufficient crystal growth, resistivity is increased 10 times or more as compared with that of a sufficiently crystallized vapor grown carbon fiber which has a mean interplanar spacing $d_{002}$ of 0.340 nm or less. When such a vapor grown carbon fiber with low crystallization is added to the resin, electron transfer at the interfaces (fiber/resin/fiber) becomes difficult. Therefore, in order to attain thermal conductivity and electrical conductivity of the same level as obtained in the case where a well-crystallized vapor grown carbon fiber is used, the required amount of the low-crystallized vapor grown carbon fiber is twice or more the amount of well-crystallized vapor grown carbon fiber.

In the vapor grown carbon fiber employed in the present invention, the ratio (Id/Ig) is preferably from 0.1 to 1.3, more preferably 0.15 to 1.2, still more preferably 0.2 to 1.15, wherein Id represents a peak height of a band ranging from 1,341 to 1,349 $cm^{-1}$ and Ig represents a peak height of a band ranging from 1,570 to 1,578 $cm^{-1}$, as observed in a Raman scattering spectrum.

The aforementioned interplanar spacing provides information about the stacked layer structure of carbon, whereas the (Id/Ig) value as determined through a Raman scattering spectrum provides information about in-plane crystallinity of carbon. A Raman band observed in the region 1,341 to 1,349 $cm^{-1}$ in a Raman scattering spectrum is known to reflect irregularity in crystal structure of carbon, whereas a Raman band observed in the region 1,570 to 1,578 $cm^{-1}$ is known to reflect crystallinity of carbon. The ratio (Id/Ig) serves as an index representing the degree of regularity in graphene arrangement. In other words, the smaller the ratio (Id/Ig), the smaller the number of defects in the graphene sheet consisting of graphenes. On the other hand, a ratio (Id/Ig) of 1.3 or more indicates that graphenes are randomly arranged in a patchwork manner, which is not preferred, since diffusion points in relation to thermal transfer and $\pi$ electron transfer increase, thereby lowering thermal conductivity and electrical conductivity.

The vapor grown carbon fiber employed in the present invention and having the aforementioned characteristics may be produced through thermal decomposition of a carbon source (organic compound) in the presence of an organic transition metal compound.

Examples of the carbon source (organic compound) serving as a raw material for producing vapor grown carbon fiber include, in the gas form, toluene, benzene, naphthalene, ethylene, acetylene, ethane, natural gas, carbon monoxide, and mixtures thereof. Of these, aromatic hydrocarbons such as toluene and benzene are preferred.

The organic transition metal compound contains a transition metal which serves as a catalyst. Examples of the transition metal include metal elements of Groups 4 to 10 (in the periodic table). Among organometallic compounds, compounds such as ferrocene and nickelocene are preferred.

In addition, as a co-catalyst for effectively removing gas such as hydrogen adsorbed on the surfaces of transition metal catalyst particles in an thermal decomposition atmosphere to thereby enhancing catalytic activity, sulfur or sulfur compound such as thiophene may be used.

The aforementioned organic compound, organic transition metal compound and sulfur compound are supplied into a reactor furnace (e.g., a reaction tube) heated at 800 to 1,300° C. by using a reducing gas such as hydrogen as a carrier gas to cause thermal decomposition, whereby carbon fiber is produced.

The form of the raw material may be a solution in which an organic transition metal compound and a sulfur compound are dissolved in an aromatic hydrocarbon or a gas vaporized at 500° C. or lower. In the case where the raw material is liquid, the raw material is vaporized/decomposed on the reactor wall, which results in unevenness of material concentration in the reactor and leads to tendency of thus produced carbon fiber filaments to aggregate. Therefore, the raw material is preferably in the gas form, which has uniform concentration in the reaction tube.

The amount ratio of sulfur compound co-catalyst to transition metal catalyst (sulfur/(transition metal+sulfur)) is preferably 10 to 35 mass %. When the ratio is less than 10 mass %, hydrogen adsorbed on the catalyst cannot sufficiently be removed, thereby inhibiting supply of a carbon source to the catalyst and generating carbon particles other than carbon fiber, which is not preferred. When the ratio is more than 35 mass %, branching of fiber filaments and radial formation of fiber filaments are promoted by increased catalytic activity, resulting in increase in interaction between fiber filaments and formation of robust aggregates of filaments, which is not preferred.

The number of branching points and the degree of unraveling of fiber aggregates are determined by concentration of the raw material at the time of synthesis. In other words, when the concentration of the raw material is high in the gas phase, heterogeneous nucleation of the catalyst particles occurs on the surfaces of formed fiber filaments, which leads to further generation of filaments formed from the fiber filament surfaces to thereby form carbon fiber having a form like silver frost. In addition, fiber filaments produced in the high concentration of the raw material are entangled so that the entangled filaments are difficult to be unraveled. Therefore, the amount ratio of the raw material to the carrier gas in the reaction tube is preferably 1 g/L or less, more preferably 0.5 g/L or less, still more preferably 0.2 g/L or less.

The thus-produced is preferably baked in an inert atmosphere at 900 to 1,300° C., thereby removing an organic substance such as tar which has adhered on the fiber during reaction. In order to enhance the electrical conductivity of the vapor grown carbon fiber, the vapor grown carbon fiber is preferably further heat-treated in an inert atmosphere at 2,000 to 3,500° C., thereby promoting crystal growth.

No particular limitation is imposed on the heat-treatment furnace for crystal growth, and any of generally employed furnaces such as a Acheson-type furnace, a resistance furnace, or a high-frequency furnace may be employed, so long as the furnace can maintain a target temperature of 2,000° C. or higher, preferably 2,300° C. or higher. Alternatively, a carbon powder or a compact may be heated through direct passage of electricity.

The atmosphere where the aforementioned heat treatment is performed is a non-oxidizing atmosphere, preferably a rare gas atmosphere containing one or more species selected from among argon, helium, neon, etc. The time for heat treatment is preferably as short as possible, from the viewpoint of productivity. When the carbon fiber is heated for a long period of time, the fiber is sintered to be solidified, thereby lowering production yield. Thus, it is sufficient to maintain the target temperature for 10 minutes to 1 hour after the temperature at the core portion of the compact has reached the target temperature.

In order to further grow crystals of carbon fiber for enhancing the electrical conductivity, the carbon fiber may be graphitized at 2,000 to 3,500° C. in an inert atmosphere. In this step, a boron compound such as boron carbide ($B_4C$), boron oxide ($B_2O_3$), elemental boron, boric acid ($H_3BO_3$), or a borate salt may be added to the carbon fiber.

No particular limitation is imposed on the amount of the boron compound to be added, and the amount varies in accordance with chemical and physical characteristics of the boron compound employed. When boron carbide ($B_4C$) is used, the amount is preferably 0.05 to 10 mass % based on the amount of vapor grown carbon fiber, more preferably 0.1 to 5 mass %.

Through the heat treatment in the presence of a boron compound, the crystallinity of carbon in the carbon fiber increases, thereby elevating the electrical conductivity. The boron content in the crystals of carbon fiber or on the crystal surface is preferably 0.01 to 5 mass %. In order to enhance conductivity of the carbon fiber and affinity of the carbon fiber with respect to the resin, the boron content is more preferably 0.1 mass % or more. Meanwhile, the amount of boron which substitutes carbon atoms forming a graphene sheet is approximately 3 mass %. Thus, when the boron content is 5 mass % or higher, the excess boron is present in the form of boron carbide or boron oxide, which may lower conductivity and is not preferred.

The synthetic resin employed in the present invention is a heat-resistant resin. Specifically, the resin preferably has a glass transition temperature of 160° C. or higher and/or a melting point of 160° C. or higher.

Examples of such heat-resistant resins include fluororesin, polyimide, polyamide-imide, polyether-imide, polyether-ether-ketone-polyether-ketone, polysulfone, polyether-sulfone, polybenzimidazole, poly(phenylene sulfide), poly(ethylene naphthalate), polyarylate, aromatic polyamide, polycarbonate, modified polyphenylene ether, poly(butylene terephthalate), poly(ethylene terephthalate), cycloolefin polymer, polypropylene, epoxy resin, phenolic resin, and unsaturated polyester resin. One of these resins may be used singly or two or more species thereof may be used in combination.

The composition of the present invention may further contain carbon fiber. No particular limitation is imposed on the type of carbon fiber, but PAN- or pitch-derived carbon fiber is preferred. No particular limitation is imposed on the cross-section shape of the carbon fiber. The carbon fiber has a mean fiber diameter of 1 to 30 μm, preferably 1 to 20 μm, particularly preferably 3 to 10 μm, and has a fiber length of 0.1 to 30 mm, preferably 1 to 20 mm, particularly preferably 3 to 15 mm. When the fiber has a diameter of 3 μm or more, breakage of the fiber filaments during molding is prevented, and when the fiber diameter is 10 μm or less, high electrical conductivity can be maintained.

In addition to vapor grown carbon fiber, by further blending the aforementioned carbon fiber into the composition of the present invention, variation in electrical conductivity and thermal conductivity of molded products of the composition can be narrowed and the properties can be stabilized.

In order to enhance affinity of the carbon fiber with respect to the resin, the carbon fiber may be oxidized to thereby introduce a phenolic hydroxyl group, a carboxyl group, a quinone group, or a lactone group to the surface of the carbon fiber. In addition, the carbon fiber may be surface-treated with a silane-base, titanate-base, aluminum-base or phosphate ester-base coupling agent or the like.

The amount of vapor grown carbon fiber added to the resin is preferably 5 to 370 parts by mass based on 100 parts by mass of the synthetic resin. In a case where the resin composition is used as a separator in a polymer electrolyte fuel cell or the like, in which thermal conductivity is a key property, the amount of vapor grown carbon fiber is preferably 45 to 370 parts by mass, more preferably 150 to 250 parts by mass. When the amount of vapor grown carbon fiber is in excess of 370 parts by mass, it is difficult to control the dimensional accuracy and shape accuracy of products molded according to use within a desired level, whereas when the amount is less than 45 parts by mass, thermal conductivity required for the use may fail to be attained. In a case where the resin composition is used as sliding members, in which wear resistance is a key property, the amount of vapor grown carbon fiber is preferably 5 to 75 parts by mass, more preferably 25 to 50 parts by mass. When the amount of vapor grown carbon fiber is in excess of 75 parts by mass, strength and wear resistance of the sliding members may be insufficient, whereas when the amount is less than 5 parts by mass, thermal conductivity may be unsatisfactory.

When the composition contains an additional carbon fiber, the amount of the carbon fiber is preferably 5 to 200 parts by mass based on 100 parts by mass of the synthetic resin, more preferably 10 to 100 parts by mass, still more preferably 30 to 50 parts by mass. When the amount of the carbon fiber is less than 5 parts by mass, uniformity in thermal conductivity and electrical conductivity may fail to be maintained, whereas when the amount is in excess of 200 parts by mass, appearance of the molded products is poor and a smooth contact surface cannot be provided, which may lead to damage to a counter member through grinding. Moreover, in a case where the resin composition is employed in a use where thermal conductivity is important, the amount of the carbon fiber is preferably from 8 to 200 parts by mass while in a case where the resin composition is employed in a use where wear resistance is important, the amount of the carbon fiber is preferably from 5 to 75 parts by mass.

It is preferable to suppress breakage of the vapor grown carbon fiber to a minimum level during the process of mixing the vapor grown carbon fiber with the synthetic resin. Specifically, the percent breakage of vapor grown carbon fiber is preferably controlled to 20% or less, more preferably 15% or less, particularly preferably 10% or less. The percent breakage may be evaluated through comparison of aspect ratio of the carbon fiber before and after mixing/kneading (e.g., from an electron microscopic (SEM) image).

In order to perform kneading with suppressing breakage of the vapor grown carbon fiber to a minimum possible level, the following method may be employed.

Generally, when a thermoplastic resin or a thermosetting resin is melt-kneaded with an inorganic filler, high shear force is applied to aggregated inorganic filler, thereby breaking the inorganic filler to form minute fragments, whereby the inorganic filler is uniformly dispersed in a molten resin. As a kneader which can generate such a high shear force, a variety of kneaders such as a kneader based on a stone mill mechanism and a co-rotating twin-screw extruder having in a screw element kneading disks where high shear force is applied. However, when such a type of kneader is employed, vapor grown carbon fiber is broken during the kneading step. If a singe-screw kneader generating weak shear force is employed, breakage of carbon fiber is prevented, but uniform dispersion of carbon fiber cannot be attained. Therefore, in order to attain uniform dispersion and at the same time, suppress breakage of the fiber, it is preferable that shear force be reduced through employment of a same-direction twin-screw extruder having no kneading disk or it is preferable to use a pressure kneader which attains dispersion over a long period of time without applying high shear force or a single-screw extruder having a specially designed mixing element. In addition, it is preferable to control the temperature of the resin during kneading to the upper limit of the temperature range where the resin is not decomposed. Generally, the higher the resin temperature, the lower the melt viscosity of the resin and the more reduced the shear force applied can be. As the mixing energy, 5,000 MJ/m$^3$ or less is preferable.

As a method for feeding vapor grown carbon fiber to a kneader, it is preferable to feed vapor grown carbon fiber to a molten synthetic resin or a liquid resin material which forms synthetic resin when cured. For example, when the vapor grown carbon fiber and a thermoplastic resin is kneaded by use of a co-rotating twin-screw extruder, resin pellets are fed to a hopper provided on the upstream side of the kneader. The resin pellets transferred by means of the screws are melted by heat produced by a heater and shear heat generated by the screws. Vapor grown carbon fiber is fed from the midstream of the kneader to the molten resin by way of side feeding, whereby the molten resin and the vapor grown carbon fiber are kneaded. It is not preferable to feed the vapor grown carbon fiber and the resin pellets simultaneously from the hopper to the extruder, since the vapor grown carbon fiber is pulverized by the resin pellets until the pellets are melted.

Similar to the case of vapor grown carbon fiber, in order to prevent breakage of fiber filaments, it is preferable to feed carbon fiber is to a molten synthetic resin or a liquid resin material which forms synthetic resin by curing.

Since the vapor grown carbon fiber employed in the present invention has a bulk density of about 0.01 to 0.1 g/cm$^3$ and readily entrains air. Thus, when a conventional single-screw extruder and a twin-screw (same direction) extruder is employed, degassing and high-density charging are difficult. In this case, a batch-type pressure kneader may be employed in order to suppress breakage of the carbon fiber to a minimum possible level. The thus-kneaded product obtained by use of a batch-type pressure kneader may be pelletized by means of a single-screw extruder before the product becomes solid.

The thus-produced resin composition of the present invention has a heat deflection temperature under high load (ASTM D648) of 160° C. or higher and a thermal conductivity of 0.8 W/mK or higher. The composition may have a volume resistivity of $1 \times 10^{-3}$ to $1 \times 10^2$ Ωcm and a thermal conductivity of 1.5 W/mK or more.

The resin composition of the present invention has excellent sliding properties as well as excellent heat resistance and heat-radiation performance. Thus, the composition can be used for sliding materials usable at high temperature and under high heat generation conditions and for a separator of a polymer electrolyte fuel cell.

Examples of products containing the sliding materials include gears, bearings for use in a sliding friction or rolling friction mechanism, bearings, brake components, clutch components, seal members for scroll compressors and other apparatuses, piston rings, resin component for use in a mechanical transmission mechanism (gears, friction pulleys, cams, etc.), and clock mechanism components. The resin composition of the present invention can be suitably employed as a sliding material in the above products. These sliding materials may be produced through any of conventionally known molding methods for resin compositions. Of these, injection molding is preferred.

EXAMPLES

The present invention will next be described in detail by way of typical examples, which are provided only for an illustration purpose and should not be construed as limiting the invention thereto.

Vapor grown carbon fibers employed in the Examples and the Comparative Examples were produced through the following methods.

(1) Vapor Grown Carbon Fiber-1

Vapor grown carbon fiber VGCF (registered trademark, manufactured by Showa Denko K.K.) was used.

(2) Vapor Grown Carbon Fiber-2

Benzene, ferrocene, and thiophene were mixed together in proportions by mass of 92:7:1, to thereby prepare a liquid raw material. The liquid was fed to a vaporizer in which the temperature had been predetermined at 400° C., to thereby vaporize. By use of a hydrogen carrier gas, the thus-vaporized raw material gas was fed to an SiC-made reactor (inner diameter: 120 mm, height: 2,000 mm) which had been heated to 1,250° C. In this case, the feed amount of the raw material was regulated to 10 g/min, and the flow rate of the hydrogen gas was regulated to 60 L/min.

The thus-obtained reaction product (80 g) was charged into a graphite-made crucible (inner diameter: 100 mm, height: 150 mm), and baked in an argon atmosphere at 1,000° C. for 1 hour, followed by graphitization in an argon atmosphere at 3,000° C. for 30 minutes.

(3) Vapor Grown Carbon Fiber-3

Vapor grown carbon fiber-1 (60 g) and SUS balls (10 mmφ, 3 kg) were placed in a SUS-made container (inner volume: 2 L), and the mixture was pulverized by use of a vibration mill (Vibration mill MB1, product of Chuo Kakohkii, Co., Ltd.) at 1,000 cpm for 180 minutes.

Physical properties of vapor grown carbon fibers 1 to 3 were determined through the following procedure, and the results are shown in Table 1.

i) Average Fiber Diameter

Images were taken at a magnification of 30,000 in 30 vision fields by a scanning electron microscope. Fiber diameters of 300 filaments were measured by means of an image analyzer (LUZEX-AP, product of Nireco Corporation) and the number average fiber diameter was calculated.

ii) Average Fiber Length

Panoramic images were taken continuously at a magnification of 3,000 in 30 vision fields by a scanning electron microscope. Fiber lengths of 300 filaments were measured by means of an image analyzer and the number average fiber length was calculated.

iii) Aspect Ratio

Aspect ratio was obtained by dividing the average fiber length by the average fiber diameter.

iv) Branching Degree of Fiber

In the above observation for fiber length determination, the number of branching points per 1 μm fiber was obtained by dividing the total number of branching points observed in 300 fiber filaments by the total number of fiber lengths of 300 fiber filaments.

V) Bet Specific Surface Area

BET specific surface area was determined through a nitrogen gas adsorption method (by means of NOVA 1000, product of Yuasa Ionics Inc.).

vi) Mean Interplanar Spacing ($d_{002}$)

The $d_{002}$ Values were determined through powder X-ray diffraction (by means of Rigaku Geigerflex manufactured by Rigaku) while Si was used as an internal standard.

vii) Peak Intensity Ratio (Id/Ig) Determined from a RAMAN Scattering Spectrum

The peak intensity ratio (Id/Ig), wherein Id represents a peak height of a band ranging from 1,341 to 1,349 $cm^{-1}$ and Ig represents a peak height of a band ranging from 1,570 to 1,578 $cm^{-1}$ as determined from a Raman scattering spectrum was determined by means of a Raman spectrometer (LabRam HR, product of Jobin Yvon).

TABLE 1

|  | Vapor grown carbon fiber-1 | Vapor grown carbon fiber-2 | Vapor grown carbon fiber-3 |
|---|---|---|---|
| Mean fiber diameter (nm) | 180 | 100 | 180 |
| Mean fiber length (μm) | 9 | 13 | 2 |
| Aspect ratio (—) | 50 | 130 | 11 |
| Branching degree (counts/μm) | 0.10 | 0.20 | 0 |
| Specific surface area ($m^2/g$) | 12 | 21 | 13 |
| $d_{002}$ (nm) | 0.338 | 0.338 | 0.339 |
| Id/Ig (—) | 0.1 | 0.1 | 0.2 |

Examples 1 to 3, Comparative Examples 1 to 4

Polyether-ether-ketone resin (PEEK: product of Victrex MC) was used as a synthetic resin, and chopped fiber (HTA-C6-S, product of Toho Tenax Co., Ltd.) was used as a carbon fiber.

These raw materials were kneaded in compositional proportions shown in Table 2. Kneading was performed by use of a co-rotating twin-screw extruder (PCM 30, product of Ikegai Corporation) at a resin temperature of 380° C. Vapor grown carbon fiber and carbon fiber were fed to the extruder through side-feeding.

Each resin composition was molded into test plates (100× 100×3 mm-thickness) by means of an injection molding machine (Sicap-type, clamping force 75 tons, product of Sumitomo Heavy Industries, Ltd.). Molding was performed at a molding temperature of 400° C., a mold temperature of 180° C., and an injection speed of 50 mm/second.

These molded products were measured in terms of kinetic friction coefficient, wear amount of aluminum, wear depth of composite material, thermal conductivity, volume resistivity, and heat deflection temperature, through the following procedure. The results are shown in Table 2.

i) Kinetic Friction Coefficient

Determined in accordance with JIS K7125 ii) Wear Amount of Aluminum and Wear Depth of Composite Material

The wear amount of aluminum and wear depth of composite material were measured through a thrust wear test. Specifically, the thrust wear test was conducted by using aluminum material as counter member (hollow cylinder test piece) at a load of 150 N and a rotation speed of 0.5 m/s for 2 hours by means of a thrust wear tester (product of Toyo Seiki Seisaku-sho, Ltd.). The testing procedure was in accordance with JIS K7218 method A.

iii) Thermal Conductivity

Determined through the hot wire method by use of a quick thermal conductivity meter (product of Kyoto Electronics Manufacturing Co., Ltd.)

iv) Volume Resistivity

Measured in accordance with the four-probe method by use of Loresta HP MCP-T410 (product of Mitsubishi Chemical Corporation)

v) Heat Deflection Temperature

The molded plates were cut into test pieces (10 mm×100 mm×3 mm). Using the test pieces, heat deflection temperature was determined as a load-deflection temperature by means of an HDT tester (product of Toyo Seiki Seisaku-sho, Ltd.) in accordance with ASTM D648.

having a mean fiber diameter of 1 to 30 μm is contained in an amount of 8 to 200 parts by mass, with respect to 100 parts by mass of the synthetic resin.

6. The heat-resistant sliding resin composition as claimed in claim 1, wherein the volume resistivity falls within a range of $1 \times 10^{-3}$ to $1 \times 10^2$ Ωcm and a thermal conductivity is 1.5 W/mK or higher.

7. The heat-resistant sliding resin composition as claimed in claim 1, wherein the synthetic resin is a heat-resistant resin having a glass transition temperature of 160° C. or higher and/or a melting point of 160° C. or higher.

8. The heat-resistant sliding resin composition as claimed in claim 7, wherein the heat-resistant resin is at least one species selected from among fluororesin, polyimide, polyamide-imide, polyether-imide, polyether-ether-ketone, polyether-ketone, polysulfone, polyether-sulfone, polybenzimidazole, poly(phenylene sulfide), poly(ethylene naphthalate), polyarylate, aromatic polyamide, polycarbonate, modified

TABLE 2

| | VGCF employed | Composition (mass %) | | | Kinetic friction coeff. | Al wear amount (mmg) | Composite wear depth (μm) | Thermal conductivity (W/mK) | Volume resistivity (Ωcm) | HDT (° C.) |
|---|---|---|---|---|---|---|---|---|---|---|
| | | PEEK | VGCF | CF | | | | | | |
| Ex. 1 | VGCF-1 | 60 | 10 | 30 | 0.1 | 0 | 60 | 0.8 | $4.0 \times 10^{-1}$ | 260< |
| Ex. 2 | VGCF-1 | 60 | 20 | 20 | 0.1 | 0 | 30 | 1.7 | $1.5 \times 10^{-1}$ | 260< |
| Ex. 3 | VGCF-2 | 65 | 10 | 25 | 0.1 | 0 | 20 | 1.8 | $2.5 \times 10^{-1}$ | 260< |
| Comp. Ex. 1 | VGCF-1 | 70 | 3 | 27 | 0.1 | 3 | 180 | 0.5 | $6.0 \times 10^{-1}$ | 260< |
| Comp. Ex. 2 | VGCF-3 | 60 | 10 | 30 | 0.1 | 2 | 120 | 0.6 | $5.5 \times 10^{-1}$ | 260< |
| Comp. Ex. 3 | — | 70 | 0 | 30 | 0.1 | 6 | 400 | 0.45 | $8.0 \times 10^{-1}$ | 260< |
| Comp. Ex. 4 | — | 60 | 0 | 40 | 0.1 | 15 | 800 | 0.5 | $6.0 \times 10^{-1}$ | 260< |

*Heat deflection temperature (HDT): "260<" denotes 260° C. (apparatus-related upper measurable limit) or higher
VGCF: Vapor grown carbon fiber
CF: Carbon fiber

The invention claimed is:

1. A heat-resistant sliding resin composition, comprising a vapor grown carbon fiber having a specific surface area of 10 to 50 m²/g, a mean aspect ratio of 20 to 500 and a mean fiber diameter of 50 to 200 nm and a synthetic resin, wherein a heat deflection temperature under high load (ASTM D648) is 160° C. or higher and a thermal conductivity is 0.8 W/mK or higher.

2. The heat-resistant sliding resin composition as claimed in claim 1, wherein the vapor grown carbon fiber is contained in an amount of 5 to 370 parts by mass with respect to 100 parts by mass of the synthetic resin.

3. The heat-resistant sliding resin composition as claimed in claim 1, containing 5 to 200 parts by mass of a carbon fiber having a mean fiber diameter of 1 to 30 μm blended therein with respect to 100 parts by mass of the synthetic resin.

4. The heat-resistant sliding resin composition as claimed in claim 3, wherein the vapor grown carbon fiber is contained in an amount of 5 to 75 parts by mass and the carbon fiber having a mean fiber diameter of 1 to 30 μm is contained in an amount of 5 to 75 parts by mass, with respect to 100 parts by mass of the synthetic resin.

5. The heat-resistant sliding resin composition as claimed in claim 3, wherein the vapor grown carbon fiber is contained in an amount of 45 to 370 parts by mass and the carbon fiber polyphenylene ether, poly(butylene terephthalate), poly(ethylene terephthalate), cycloolefin polymer, polypropylene, epoxy resin, phenolic resin, and unsaturated polyester resin.

9. A method for producing the heat-resistant sliding resin composition as recited in claim 1, comprising blending a vapor grown carbon fiber into a molten synthetic resin or a liquid resin raw material which forms a synthetic resin when cured.

10. The method for producing a heat-resistant sliding resin composition as claimed in claim 9, wherein breakage of the vapor grown carbon fiber during mixing is suppressed to 20% or less.

11. The method for producing a heat-resistant sliding resin composition as claimed in claim 9, wherein mixing is performed at an energy of 5,000 MJ/m³ or less.

12. A sliding material which is formed through molding of the heat-resistant sliding resin composition as recited in claim 1.

13. The sliding material as claimed in claim 12, wherein molding is performed through injection molding.

14. A gear using a sliding material formed through molding the heat-resistant sliding resin composition as recited in claim 4.

15. A bearing for use in a sliding friction or rolling friction mechanism, which bearing is formed through molding the heat-resistant sliding resin composition as recited in claim 4.

16. A bearing using a sliding material formed through molding the heat-resistant sliding resin composition as recited in claim 4.

17. A brake component using a sliding material formed through molding the heat-resistant sliding resin composition as recited in claim 4.

18. A clutch component using a sliding material formed through molding the heat-resistant sliding resin composition as recited in claim 4.

19. A seal member using a sliding material formed through molding the heat-resistant sliding resin composition as recited in claim 4.

20. A piston ring using a sliding material formed through molding a heat-resistant sliding resin composition as recited in 4 above.

21. A resin component for use in a mechanical transmission mechanism, the resin component employing a sliding material formed through molding a heat-resistant sliding resin composition as recited in claim 4.

22. A clock mechanism component employing a sliding material formed through molding a heat-resistant sliding resin composition as recited in claim 4.

23. A separator for use in a polymer electrolyte fuel cell, the separator employing a sliding material formed through molding a heat-resistant sliding resin composition as recited in claim 5.

* * * * *